(12) United States Patent
Walsdorf et al.

(10) Patent No.: US 7,379,796 B2
(45) Date of Patent: May 27, 2008

(54) LOW-ALTITUDE FLIGHT GUIDANCE SYSTEM, WARNING SYSTEM FOR LOW-ALTITUDE FLIGHT GUIDANCE, WARNING GENERATOR FOR LOW-ALTITUDE FLIGHT GUIDANCE AND METHOD FOR LOW-ALTITUDE FLIGHT GUIDANCE

(75) Inventors: Anton Walsdorf, Unterhaching (DE); Johannes Drexler, Friedberg (DE); Lars Schöpfer, Munich (DE); Alexander Hermann Knoll, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 237 days.

(21) Appl. No.: 10/927,078

(22) Filed: Aug. 27, 2004

(65) Prior Publication Data
US 2005/0049763 A1 Mar. 3, 2005

(30) Foreign Application Priority Data
Aug. 30, 2003 (DE) .............................. 103 40 374
Aug. 18, 2004 (DE) ..................... 10 2004 040 249

(51) Int. Cl.
*G06G 7/76* (2006.01)
(52) U.S. Cl. .......................................... 701/9; 244/180
(58) Field of Classification Search .................... 701/3, 701/4, 9; 340/963, 967, 970; 73/178 T; 244/180, 181; 342/65
See application file for complete search history.

(56) References Cited

U.S. PATENT DOCUMENTS

| | | | | |
|---|---|---|---|---|
| 3,315,255 A | * | 4/1967 | Sullivan et al. ............... | 342/65 |
| 4,021,009 A | * | 5/1977 | Baker et al. ................. | 244/180 |
| 4,224,669 A | * | 9/1980 | Brame ........................... | 701/8 |
| 4,538,230 A | * | 8/1985 | Reust et al. ................... | 701/8 |
| 4,646,244 A | | 2/1987 | Bateman et al. | |
| 4,849,756 A | * | 7/1989 | Bateman ..................... | 340/970 |
| 4,916,448 A | * | 4/1990 | Thor .......................... | 340/970 |
| 4,939,513 A | * | 7/1990 | Paterson et al. ............ | 340/970 |
| 5,136,512 A | * | 8/1992 | Le Borne .................... | 701/301 |

(Continued)

FOREIGN PATENT DOCUMENTS

EP 0750238 12/1996

(Continued)

*Primary Examiner*—Dalena Tran
(74) *Attorney, Agent, or Firm*—Greenblum & Bernstein, P.L.C.

(57) ABSTRACT

A low-altitude flight guidance system for an aircraft including a warning generator that generates a warning based upon a predicted position. The system further including a first sensor system having a terrain database and a calculation module that determines a current position of the aircraft with respect to terrain stored in the terrain database and that determines a reference altitude $h_{DB}$ of the terrain at the current position. The system further includes a second sensor system and a module that determines a predetermined flight altitude difference $\Delta h_F$ at the predicted position and terrain data in a region U of the predicted position. Moreover, the system includes an altitude prediction module that predicts an altitude and forwards the predicted altitude to the warning generator. The warning is based upon the aircraft reaching, approaching, or exceeding a warning altitude limit, and the altitude prediction module determination for the predicted position is based upon a prediction set point. The instant abstract is neither intended to define the invention disclosed in this specification nor intended to limit the scope of the invention in any way.

10 Claims, 4 Drawing Sheets

U.S. PATENT DOCUMENTS

| | | | |
|---|---|---|---|
| 5,677,842 A * | 10/1997 | Denoize et al. | 701/301 |
| 5,798,712 A | 8/1998 | Coquin | |
| 5,892,462 A * | 4/1999 | Tran | 340/961 |
| 5,936,552 A * | 8/1999 | Wichgers et al. | 340/963 |
| 6,157,891 A * | 12/2000 | Lin | 701/301 |
| 6,292,721 B1 * | 9/2001 | Conner et al. | 701/9 |
| 6,484,072 B1 * | 11/2002 | Anderson et al. | 701/9 |
| 6,538,581 B2 | 3/2003 | Cowie | |
| 6,879,886 B2 * | 4/2005 | Wilkins et al. | 701/3 |
| 2002/0097169 A1 | 7/2002 | Johnson et al. | |

FOREIGN PATENT DOCUMENTS

| | | |
|---|---|---|
| EP | 0790487 | 8/1997 |

* cited by examiner

LOW-ALTITUDE FLIGHT GUIDANCE
SYSTEM, WARNING SYSTEM FOR
LOW-ALTITUDE FLIGHT GUIDANCE,
WARNING GENERATOR FOR
LOW-ALTITUDE FLIGHT GUIDANCE AND
METHOD FOR LOW-ALTITUDE FLIGHT
GUIDANCE

CROSS-REFERENCE TO RELATED
APPLICATIONS

The present application claims priority under 35 U.S.C. § 119 of German Patent Application No. 103 40 374.4, filed on Aug. 30, 2003, and German Patent Application No. 10 2004 040 249.3 filed Aug. 18, 2004, the disclosures of which are expressly incorporated by reference herein in their entireties.

BACKGROUND OF THE INVENTION

1. Field of the Invention

The invention relates to a low-altitude flight guidance system, a warning system for low-altitude flight guidance, a warning generator for low-altitude flight guidance and a method for low-altitude flight guidance.

2. Discussion of Background Information

From the general prior art low-altitude flight guidance systems it is known to generate warning signals on a basis of a current distance from the ground. At very low flight altitudes and also with aircraft having only a relatively low vertical acceleration capability, the crew of the aircraft cannot be supported with the necessary reliability with the known warning systems. Either frequent false alarms occur, or the warning does not come or comes too late.

SUMMARY OF THE INVENTION

An aspect of the invention is to provide a corresponding system and a method with which or through which advantageous warning signals are transmitted even at low flight altitudes over ground and with a relatively low maneuverability of the aircraft so that the pilot or a system is able to maneuver the aircraft out of the dangerous situation.

This aspect is attained with a low-altitude flight guidance system for an aircraft that includes a warning generator for generating warning outputs with respect to a predicted position at a man-machine interface or an autopilot, and a sensor system with a terrain database and a calculation module for determining the current position of the aircraft in the terrain stored in the terrain database and a reference altitude $h_{DB}$ of the terrain at the current position. Moreover, the system includes a sensor system and a module for determining a predetermined flight altitude difference $\Delta h_F$ at a predicted position and terrain data in the region U of the predicted position. The guidance system further includes a module for predicting an altitude for the warning generator with a warning based on reaching, exceeding a warning altitude limit or approaching the same. The prediction module determination of the predicted position is carried out on the basis of a prediction set point. Additionally, the altitude prediction module determines as a distance altitude limit, a distance altitude $h^*$ from the altitude of the aircraft above ground $h_G$ supplied by a sensor system, a flight altitude difference $\Delta h_F$ predetermined for the predicted position, a safety altitude $\Delta h_{WCTP}$ and a difference altitude $\Delta h_{P2}$ are calculated from terrain data with respect to the current position and the predicted position. Additionally, the safety altitude $\Delta h_{WCTP}$ is determined from the difference from the altitude of the highest point and the altitude of the predicted position in a region of the predicted position. Moreover, the difference altitude $\Delta h_{P2}$ and the safety altitude $\Delta h_{WCTP}$ are subtracted from the predicted flight altitude $h_F$ in order to obtain the distance altitude $h^*$.

The aspect may be further attained through the low-altitude flight guidance system where the sensor for measuring the flight altitude above ground can be a radar altimeter. Moreover, the prediction set point can be a prediction time $t_P$ or a prediction span. Additionally, the flight altitude $h_F$ predicted for the predicted position can be determined from the current altitude above ground $h_G$ minus the rate of ascent multiplied by the prediction time. Moreover, the prediction set point can be a flight direction or a flight path section. Additionally, the flight direction can be an actual flight direction or a desired flight direction. Furthermore, the flight path section can be a desired path section or a flight path section determined from actual data.

The aspect is also attained with a warning system for low-altitude flight guidance with a warning generator for generating warning outputs with respect to a predicted position at a man-machine interface or an autopilot, with a module for predicting an altitude for the warning generator. Moreover, a warning is based on reaching, exceeding a warning altitude limit or approaching the same. Additionally, in the prediction module, the determination of the predicted position occurs on the basis of a prediction set point, and the altitude prediction module determines a distance altitude $h^*$ from the altitude of the aircraft above ground $h_G$ supplied by a sensor system. Moreover, a flight altitude difference $\Delta h_F$ predetermined for the predicted position, a safety altitude $\Delta h_{WCTP}$ and a difference altitude $\Delta h_{P2}$ calculated from terrain data with respect to the current position and the predicted position. Additionally, the safety altitude $\Delta h_{WCTP}$ is determined from the difference from the altitude of the highest point and the altitude of the predicted position in a region of the predicted position. Moreover, the difference altitude $\Delta h_{P2}$ and the safety altitude $\Delta h_{WCTP}$ are subtracted from the predicted flight altitude $h_F$ in order to obtain the distance altitude $h^*$.

The aspect can also attained with a warning generator for low-altitude flight guidance for generating warning outputs with respect to a predicted position at a man-machine interface or an autopilot. The warning generator can include a sensor system with a terrain database and a calculation module is assigned to determine the current position of the aircraft in the terrain stored in the terrain database and a reference altitude $h_{DB}$ of the terrain at the current position. Additionally, the warning generator includes a sensor system and a module for determining a predetermined flight altitude difference $\Delta h_F$ at the predicted position, and terrain data in the region of the predicted position. Moreover, a module is assigned for predicting a distance altitude $h^*$. Additionally, the determination of the predicted position takes place in the prediction module on the basis of a prediction set point and the altitude prediction module a distance altitude $h^*$ is determined from the altitude of the aircraft above ground $h_G$ supplied by the sensor system, a flight altitude difference $\Delta h_F$ predetermined for the predicted position, a safety altitude $\Delta h_{WCTP}$ and a difference altitude $\Delta h_{P2}$ determined from terrain data with respect to the current position and the predicted position. Moreover, the safety altitude $\Delta h_{WCTP}$ is determined from the difference from the altitude of the highest point and the altitude of the predicted position in a region of the predicted position. Also, the difference altitude $\Delta h_{P2}$ and the safety altitude $\Delta h_{WCTP}$ are subtracted from the predicted flight altitude $h_F$ in order to obtain the distance height $h^*$.

The aspect is also attained with a method for low-altitude flight guidance for an aircraft. The method including determination of the current position of the aircraft in the terrain stored in a terrain database and of a reference altitude $h_{DB}$ of the terrain at the current position, determination of the predicted position on the basis of a prediction set point, calculation of a distance altitude $h^*$ from an altitude of the aircraft above ground $h_G$ supplied by a sensor system. The method further including a flight altitude difference $\Delta h_F$ predetermined for the predicted position, a safety altitude $\Delta h_{WCTP}$ and a difference altitude $\Delta h_{P2}$ calculated from terrain data with respect to the current position and the predicted position. In the method, the safety altitude $\Delta h_{WCTP}$ is calculated from the difference from the altitude of the highest point and the altitude of the predicted position in a region of the predicted position. Additionally in the method, the difference altitude $\Delta h_{P2}$ and the safety altitude $\Delta h_{WCTP}$ are subtracted from the predicted flight altitude $h_F$ in order to obtain the distance altitude $h^*$. The method further including evaluation of the distance altitude $h^*$ with respect to at least one distance altitude limit and if necessary transmitting warning signals on the basis of this evaluation to a man-machine interface.

According to the invention, a low-altitude flight guidance system for aircraft in operations near the ground, a warning system for low-altitude flight guidance, a warning generator for low-altitude flight guidance and a method for low-altitude flight guidance are provided on the basis that a distance altitude $h^*$ is determined from the altitude of the aircraft over ground $h_G$ supplied by a sensor system, a flight altitude difference $\Delta h_F$ predetermined for the predicted position P2, a safety altitude $\Delta h_{WCTP}$ and a difference altitude $\Delta h_{P2}$ determined from terrain data with respect to the current position and the predicted position; and the safety altitude $\Delta h_{WCTP}$ is calculated from the difference from the altitude of the highest point and the altitude of the predicted position (P2) in a region of the predicted position (P2), whereby the difference altitude $\Delta h_{P2}$ and the safety altitude $\Delta h_{WCTP}$ are subtracted from the predicted flight altitude $h_F$ in order to obtain the distance altitude $h^*$.

The safety altitude $\Delta h_{WCTP}$ is thereby determined from the difference from the altitude of the highest point and the altitude of the predicted position (P2) in a region of the predicted position (P2).

The sensor for measuring the flight altitude above ground can be a radar altimeter.

The prediction set point can be in particular a prediction time $t_P$ or a prediction span. The flight altitude $h_F$ predicted for the predicted position (P2) can thereby be determined from the current altitude above ground $h_G$ minus the rate of ascent multiplied by the prediction time.

Furthermore, the prediction set point can be a flight direction or a flight path section. The flight direction can thereby be an actual flight direction or a desired flight direction and the flight path section can be a desired path section or a flight path section determined from actual data.

According to the invention, a warning system for low-altitude flight guidance includes a warning generator for generating warning outputs with respect to a predicted position at a man-machine interface or an autopilot, and a module for predicting an altitude for the warning generator. The warning generator furthermore includes a warning based on reaching, exceeding a warning altitude limit ($h^*$) or approaching the same. The prediction module determination of the predicted position (P2) occurs on the basis of a prediction set point. The altitude prediction module determines a distance altitude $h^*$ from the altitude of the aircraft above ground $h_G$ supplied by a sensor system, a flight altitude difference $\Delta h_F$ predetermined for the predicted position, a safety altitude $\Delta h_{WCTP}$ and a difference altitude $\Delta h_{P2}$ calculated from terrain data with respect to the current position (P1) and the predicted position. The safety altitude $\Delta h_{WCTP}$ is determined from the difference from the altitude of the highest point and the altitude of the predicted position in a region of the predicted position, whereby the difference altitude $\Delta h_{P2}$ and the safety altitude $\Delta h_{WCTP}$ are subtracted from the predicted flight altitude $h_F$ in order to obtain the distance altitude $h^*$.

Furthermore, according to the invention a warning generator is proposed for low-altitude flight guidance for generating warning outputs with respect to a predicted position at a man-machine interface or an autopilot, to which a sensor system with a terrain database and a calculation module is assigned to determine the current position of the aircraft in the terrain stored in the terrain database and a reference altitude $h_{DB}$ of the terrain at the current position, a sensor system and a module for determining a predetermined flight altitude difference $\Delta h_F$ at the predicted position, and terrain data in the region of the predicted position. Additionally, a module is assigned for predicting a distance altitude $h^*$, and the determination of the predicted position (P2) takes place in a prediction module on the basis of a prediction set point. An altitude prediction module a distance altitude $h^*$ is determined from the altitude of the aircraft 1 above ground $h_G$ supplied by the sensor system, a flight altitude difference $\Delta h_F$ predetermined for the predicted position P2, a safety altitude $\Delta h_{WCTP}$ and a difference altitude $\Delta h_{P2}$ determined from terrain data with respect to the current position P1 and the predicted position P2. The safety altitude $\Delta h_{WCTP}$ is determined from the difference from the altitude of the highest point and the altitude of the predicted position (P2) in a region of the predicted position (P2), and the difference altitude $\Delta h_{P2}$ and the safety altitude $\Delta h_{WCTP}$ are subtracted from the predicted flight altitude $h_F$ in order to obtain the distance height $h^*$.

Furthermore, according to the invention a method is proposed for low-altitude flight guidance for an aircraft including determination of the current position of the aircraft in the terrain stored in a terrain database and of a reference altitude $h_{DB}$ of the terrain at the current position, and determination of the predicted position on the basis of a prediction set point. The method further includes calculation of a distance altitude $h^*$ from an altitude of the aircraft above ground $h_G$ supplied by a sensor system, a flight altitude difference $\Delta h_F$ predetermined for the predicted position, a safety altitude $\Delta h_{WCTP}$ and a difference altitude $\Delta h_{P2}$ calculated from terrain data with respect to the current position P1 and the predicted position P2, whereby the safety altitude $\Delta h_{WCTP}$ is calculated from the difference from the altitude of the highest point and the altitude of the predicted position P2 in a region of the predicted position P2, whereby the difference altitude $\Delta h_{P2}$ and the safety altitude $\Delta h_{WCTP}$ are subtracted from the predicted flight altitude $h_F$ in order to obtain the distance altitude $h^*$. The method moreover includes evaluation of the distance altitude $h^*$ with respect to at least one distance altitude limit and if necessary transmitting warning signals on the basis of this evaluation to a man-machine interface.

Another aspect of the invention includes a low-altitude flight guidance system for an aircraft including a warning generator that generates a warning based upon a predicted position. The system further including a first sensor system having a terrain database and a calculation module that determines a current position of the aircraft with respect to terrain stored in the terrain database and that determines a reference altitude $h_{DB}$ of the terrain at the current position. The system further includes a second sensor system and a module that determines a predetermined flight altitude difference $\Delta h_F$ at the predicted position and terrain data in a region U of the predicted position. Moreover, the system includes an altitude prediction module that predicts an altitude and forwards the predicted altitude to the warning generator. The warning is based upon the aircraft reaching, approaching, or exceeding a warning altitude limit, and the altitude prediction module determination for the predicted position is based upon a prediction set point.

In a further aspect of the invention, the warning can be output to one of a man-machine interface or an autopilot. Additionally, the altitude prediction module can determine a distance altitude h* from an altitude of an aircraft above ground $h_G$ supplied by the first sensor system, a flight altitude difference $\Delta h_F$ predetermined for the predicted position, a safety altitude $\Delta h_{WCTP}$, and a difference altitude $\Delta h_{P2}$ calculated from the terrain data with respect to the current position and the predicted position, and the safety altitude $\Delta h_{WCTP}$ can be determined from a difference of an altitude of the highest point and the altitude of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*. Furthermore, the system can include a sensor that measures the flight altitude with respect to ground, the sensor being a radar altimeter. Moreover, the prediction set point can be a prediction time $t_P$ or a prediction span. Furthermore, the flight altitude $h_F$ predicted for the predicted position can be determined from the current altitude above ground $h_G$ minus a rate of ascent multiplied by a prediction time. Additionally, the prediction set point can be a flight direction or a flight path section. Moreover, the flight direction can be one of an actual flight direction or a desired flight direction. Furthermore, the flight path section can be one of a desired path section or a flight path section determined from actual data.

Still another aspect of the invention includes a warning system for low-altitude flight guidance including a warning generator that generates a warning with respect to a predicted position. The warning system further including an altitude prediction module that predicts an altitude and forwards the predicted altitude to the warning generator. Moreover, the warning is based on reaching, exceeding or approaching a warning altitude limit, the prediction module determines the predicted position on a basis of a prediction set point, the altitude prediction module further determines a distance altitude h* from an altitude of an aircraft above ground $h_G$ supplied by a sensor system, a flight altitude difference $\Delta h_F$ predetermined for the predicted position, a safety altitude $\Delta h_{WCTP}$, and a difference altitude $\Delta h_{P2}$ calculated from terrain data with respect to a current position and the predicted position.

In a further aspect of the invention, the warning can be output to one of a man-machine interface or an autopilot. Moreover, the safety altitude $\Delta h_{WCTP}$ can be determined from a difference of an altitude of the highest point and an altitude of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*.

Yet another aspect of the invention includes a warning generator for low-altitude flight guidance that generates a warning with respect to a predicted position including a first sensor system with a terrain database and a calculation module that determines a current position of an aircraft with respect to terrain stored in the terrain database and that determines a reference altitude $h_{DB}$ of the terrain at the current position. The generator further including a second sensor system and an altitude prediction module that determine a predetermined flight altitude difference $\Delta h_F$ at the predicted position and that determines terrain data in a region of the predicted position. The generator further including a module that predicts a distance altitude h*. Moreover the determination of the predicted position takes place in the altitude prediction module on a basis of a prediction set point, and the altitude prediction module determines the distance altitude h* from an altitude of the aircraft above ground $h_G$ supplied by the first sensor system, a flight altitude difference $\Delta h_F$ predetermined for the predicted position, a safety altitude $\Delta h_{WCTP}$ and a difference altitude $\Delta h_{P2}$ determined from terrain data with respect to the current position and the predicted position.

In a further aspect of the invention, the safety altitude $\Delta h_{WCTP}$ can be determined from a difference of an altitude of a highest point and the altitude of the predicted position in a region of the predicted position, and the difference altitude $\Delta h_{P2}$ and the safety altitude $\Delta h_{WCTP}$, are subtracted from the predicted flight altitude $h_F$ in order to obtain the distance height h*. Moreover, the warning generator can output the warning to one of a man-machine interface or an autopilot.

A further aspect of the invention includes a method for low-altitude flight guidance for an aircraft including determining a current position of the aircraft with respect to terrain stored in a terrain database and determining a reference altitude $h_{DB}$ of the terrain at the current position. The method further including determining a predicted position on a basis of a prediction set point and calculating a distance altitude h* from an altitude of the aircraft above ground $h_G$ supplied by a sensor system. The method also including evaluating the distance altitude h* with respect to at least one distance altitude limit and, when necessary, transmitting warning signals on a basis of this evaluation.

An additional aspect of the method can further include calculating a flight altitude difference $\Delta h_F$ predetermined for the predicted position, a safety altitude $\Delta h_{WCTP}$, and a difference altitude $\Delta h_{P2}$ calculated from terrain data with respect to the current position and the predicted position. Moreover, the safety altitude $\Delta h_{WCTP}$ can be determined from the altitude of the highest point of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*. Additionally, the method can include transmitting the warning signals to a man-machine interface. Moreover, a warning generator can use the above-noted method.

Another aspect of the present invention includes a low-altitude flight guidance system for an aircraft including a warning generator that generates a warning based upon a predicted position. The system further including a sensor system having a terrain database and a calculator that calculates a current position of the aircraft with respect to terrain stored in the terrain database and that determines a reference altitude of the terrain at the current position. The system also having a determiner that determines a predetermined flight altitude difference at the predicted position and terrain data in a region of the predicted position. Furthermore, the system includes an altitude predictor that predicts an altitude and forwards the predicted altitude to the warning generator. In the system, the warning is based upon the aircraft reaching, approaching, or exceeding a warning altitude limit, and the altitude predictor determination for the predicted position is based upon a prediction set point.

A further aspect of the system can include the warning being output to one of an interface or an autopilot. Moreover, the system can include a sensor that measures a flight altitude with respect to ground, the sensor being a radar altimeter. Additionally, the prediction set point can be a prediction time or a prediction span. Moreover, the prediction set point can be a flight direction or a flight path section. Furthermore, the flight direction can be one of an actual flight direction or a desired flight direction. Additionally, the flight path section can be one of a desired path section or a flight path section determined from actual data.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
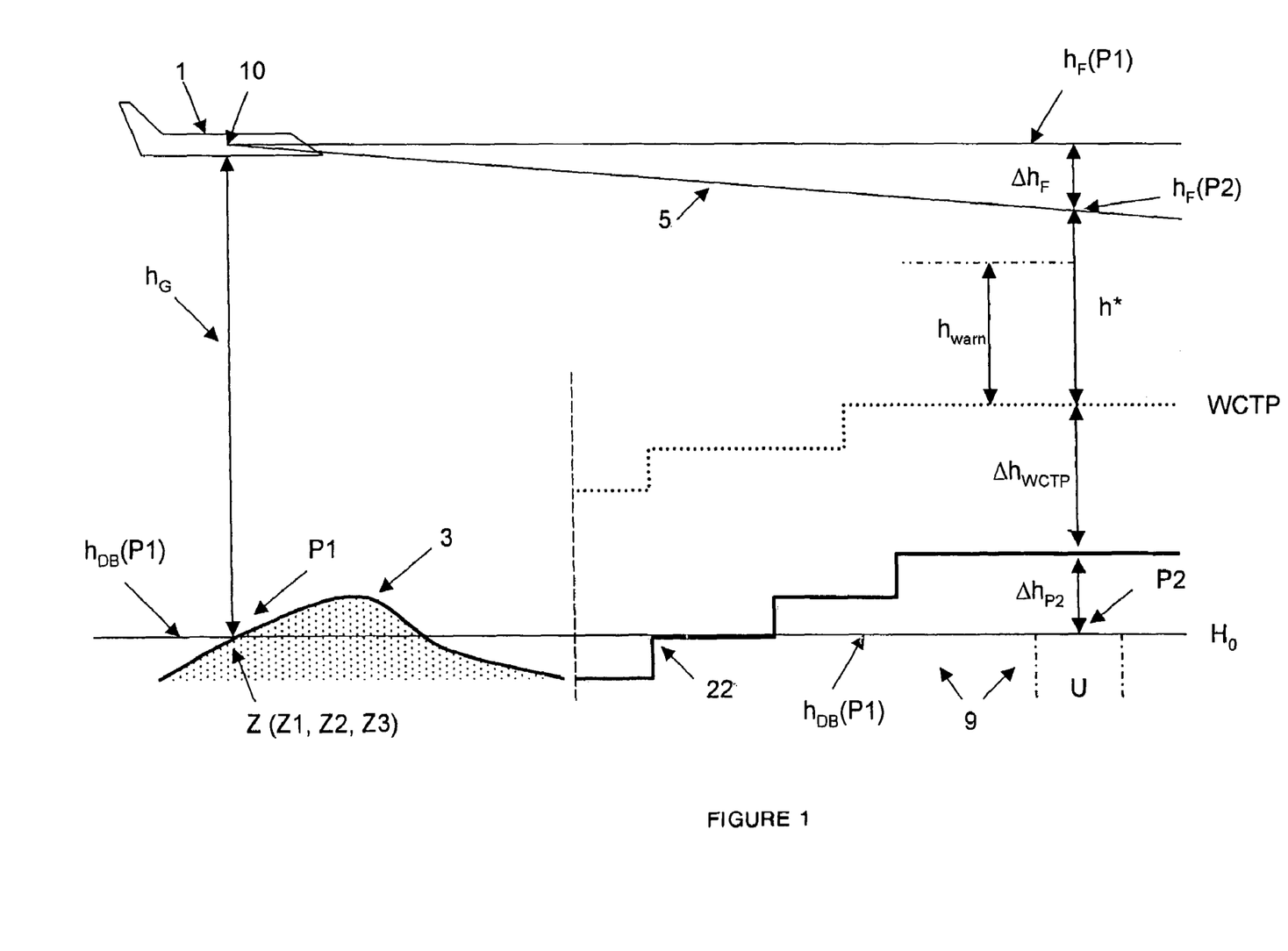
FIG. 1 shows a diagrammatic representation of a terrain altitude profile, an aircraft and various system data for determining an altitude difference from a safety altitude.

To illustrate the solution according to the invention, FIG. 1 shows diagrammatically an aircraft 1 flying at a low altitude over a terrain 3 that is shown as a terrain profile. A flight path 5 is assigned to the aircraft, which flight path is fundamentally three-dimensional and in FIG. 1 is drawn as a two-dimensional predicted flight path. Geometric auxiliary variables/auxiliary lines 9 are entered on FIG. 1 to further explain the invention. In general, the aircraft 1 has a current position with respect to a ground-based coordinate system that is determined by two dimensions, e.g., the degree of longitude and latitude. The current aircraft position is indicated in FIG. 1 by the reference number P1.

Figure 2:
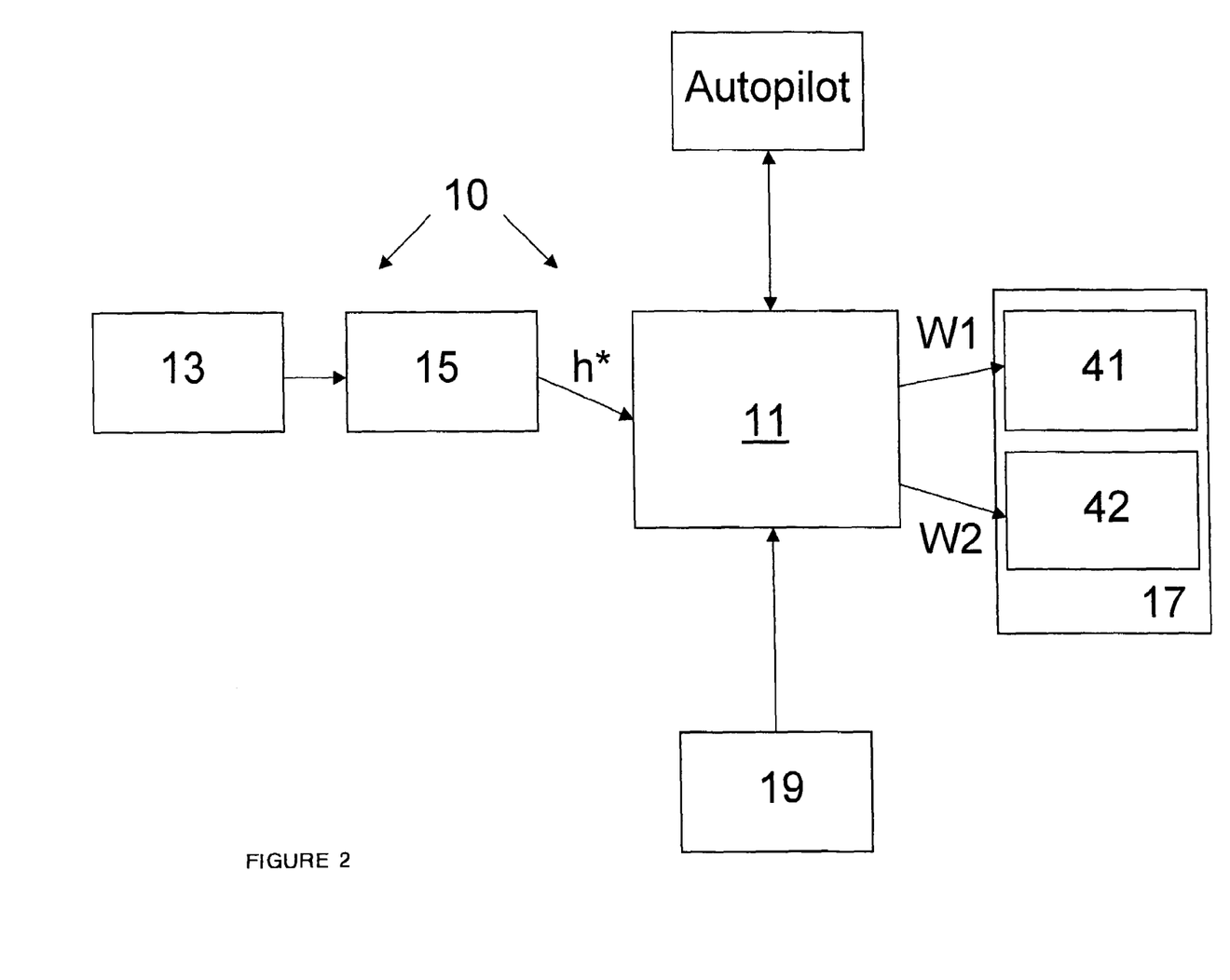
FIG. 2 shows an operational diagram of the low-altitude flight guidance system according to the invention in overview with an altitude prediction module for determining a safety altitude.

The low-altitude flight guidance system 10 according to the invention provided for implementation in an aircraft 1 has a warning generator 11 that on the basis of sensor data relating to position P1 determines warning outputs or warnings with reference to a future, foreseen or predicted position P2. The warnings can be transmitted to a man-machine interface or an autopilot.

The low-altitude flight guidance system 10 according to the invention comprises in addition to the warning generator 11 a sensor or sensor system 13, a module 15 for predicting an altitude for the warning generator 11 or an altitude prediction module 15, optionally a man-machine interface 17 and an input device 19 for the aircraft crew for initiating the operation method according to the invention for conducting the low-altitude flight guidance or for inputting necessary parameters. Instead of a man-machine interface 17 an autopilot can be provided that is assigned to the low-altitude flight guidance system 10 and that on the basis of the warnings transmitted to it commands automatically predetermined flight maneuvers or transmits them to a flight steering.

The sensor system 13 comprises a database 21 with geographically referenced altitude information. This altitude information is referred to in brief below as altitude data 22 and the referenced database as database with altitude data. The altitude information can comprise terrain data, man-made data such as buildings or cultivation, infrastructure elements or military threats or a combination of the same. The infrastructure elements can include streets, railways, or traffic and transport systems such as, e.g., cable railways. The altitude data are usually and preferably stored digitally.

In addition, the sensor system 13 comprises further sensors and a calculation module for determining the position of the aircraft within the geographically referenced altitude information of the database 21. To this end, the sensor system 13 preferably comprises further sensors, e.g., a radar altimeter and optionally inertial sensors. The altitude data 22 are primarily available in the form of vectors [z] with coordinates Z1, Z2, Z3. Alternatively, the altitude data 22 can be available as a row of points in an equidistant grid, i.e., in a raster of lattice points. For example, Z1 and Z2 are used to label the longitude and latitude on a ground-based coordinate system, and Z3 to label the altitude, e.g., of the terrain point above a reference altitude. The altitude coordinates Z3 generally result from the respectively used altitude data, i.e., depending on whether only the terrain data or also other data, such as, e.g., man-made data, are taken into consideration.

Furthermore the sensor system 13 is used to determine the current rate of ascent $$\frac{dh}{dt}$$

of the aircraft 1 which, with a corresponding plus or minus sign can also be a rate of descent. This variable is called rate of ascent for short below. To this end an air data sensor system 25 with air data sensors and a calculation module can be provided in order to carry out the calculation of the rate of ascent $$\frac{dh}{dt}$$

of the aircraft 1. However, the rate of ascent $$\frac{dh}{dt}$$

can also be determined from another sensor system or sensor unit of the aircraft, e.g., an inertial sensor system of the navigation system or another system.

A sensor for measuring the altitude above ground is provided as an elemental part of the sensor system 13, for which various sensors or devices are possible. In equipment-related terms, the sensor with which the current altitude of the aircraft 1 above ground is measured is preferably realized as a radar altimeter 27. Instead of the radar altimeter, a laser altimeter or another sensor can also be used and is within the spirit and scope of the present invention. The use of a radar altimeter or an even better altimeter is advantageous, since with it a relatively high precision can be achieved with low equipment-related costs, and thus the flight can be constructively supported in extreme proximity to the ground. Sensors with less precision would require safety reserves that would increase the minimum flight altitude. If a radar altimeter 27 is used, it can be identical to the cited radar altimeter for determining the position of the aircraft 1 in the stored altitude data. However, different devices can also be used for these functions, since different technical requirements are associated with these functions.

In summary it should therefore be stated that the sensor system 13 of the low-altitude flight guidance system 10 according to the invention can be realized in different ways and can include different types of sensor. The essential thing is that the sensor system 13 determines the following data: the altitude of the aircraft 1 above ground $h_G$, the current position P1 of the aircraft 1 in the terrain database and/or a reference altitude $h_{DB(P1)}$ of the terrain at the position P1 determined from the terrain data, the current rate of ascent of the aircraft 1 and terrain data in the region of the predicted position P2.

Instead of these variables, variables can also be used from which the cited variables can be derived.

Figure 3:
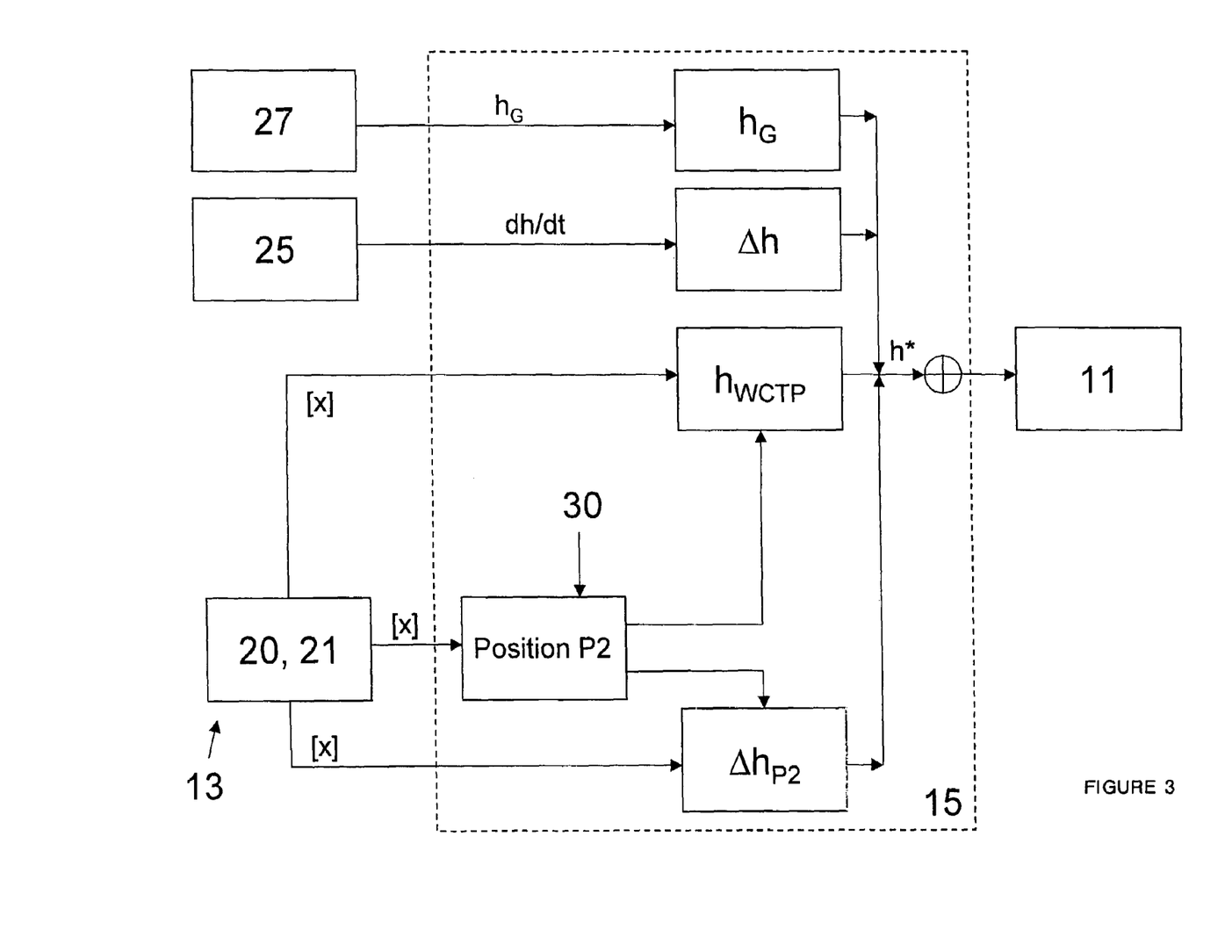
FIG. 3 shows important functions of the altitude prediction module in an operational diagram.

The altitude prediction module 15 determines the predicted position P2 on the basis of a prediction set point that can be a prediction parameter or another prediction set point. If a prediction parameter is used, this is fixed in the altitude prediction module 15 or can be adjusted. It can also be determined in assigned functions. The prediction parameter is a specification 30 for determining the position P2 from the position P1 and further data on the position P2, and is, e.g., a prediction time $t_P$ or a prediction span. Additionally or alternatively other prediction set points can be used, e.g., a flight direction or a flight path section, thus a path section in space with reference to a ground-based coordinate system. The flight direction can be an actual flight direction or a desired flight direction or in general a desired set point, e.g., a steering set point. Analogously the flight path section can be a desired path section or a flight path section determined from actual data. If a flight direction or flight path is used for predicting P2, the current rate of ascent is preferably not necessary. The flight paths can thereby also be dependent on the rate of ascent. The prediction parameters or data for determining the position P2 from the position P1 can also be determined from a combination of the cited variables.

These prediction set points and in particular the prediction parameters are generally transmitted or processed in the form of data labeled by [x] in FIG. 3. The prediction set points can be manually entered thereby into the low-altitude flight guidance system 10 or altitude prediction module 15 or fed from an assigned system, e.g., to an autopilot or the sensor system 13. In the representation of FIG. 3, the data [x] are supplied from the navigation system 20. These data can also be a value, e.g., for a statement of time or span or a vector $\bar{x}$, e.g., for the flight direction or a data set, e.g., for a flight path section. Suitable data, in particular the prediction time $t_P$ or prediction span, can also be firmly predetermined or manually adjustable in the low altitude flight guidance system 10 or altitude prediction module 15.

The prediction parameters, thus in particular the prediction time $t_P$, and/or the other prediction set points depend on the flight characteristics of the aircraft 1 and the capacity of the system implemented in it or also on the type of application of the aircraft 1. These can also be specially fixed for certain types of application and available in the altitude prediction module.

The altitude prediction module 15 is shown in FIG. 3. It determines a distance altitude h* or warning altitude $h_{warn}$ as a variable derived from the distance altitude h*, from the altitude of the aircraft 1 above ground $h_G$ supplied by the sensor system 13, a safety altitude $\Delta h_{WCTP}$ determined for the position P2, and a difference altitude $\Delta h_{P2}$ determined from terrain data for the position P2. This distance altitude h* or warning altitude $h_{warn}$ is supplied to the warning generator 11 that transmits corresponding warning signals to the man-machine interface.

To determine the difference altitude $\Delta h_{P2}$ a flight altitude $h_F$ predicted for the position P2 is determined preferably from the current altitude above ground $h_G$ minus the rate of ascent multiplied by the prediction time. An analogous method can be applied when using the alternative prediction parameters. The difference altitude $\Delta hP2$ and the safety altitude $\Delta h_{WCTP}$ are subtracted from the predicted flight altitude $h_F$ in order to obtain the distance altitude h*. A distance altitude h* can optionally be derived from this in addition. A uniform determination of the plus or minus sign is to be made in the known manner so that negative values can also be processed.

The flight altitude difference $\Delta h_F$ predetermined for the position P2 is determined from the current flight condition of the aircraft 1. In a preferred embodiment of the invention, the flight altitude difference $\Delta h_F$ is determined from the current rate of ascent of the aircraft 1 multiplied by the prediction time $t_P$ as prediction parameter.

The difference altitude $\Delta h_{P2}$ determined from altitude data for the position P2 is determined from the difference between a terrain data altitude Z3 at the position P2 and a reference altitude $H_0$ at the position P2. The reference altitude $H_0$ is preferably equal to the value of the altitude coordinate Z3 of a position or terrain point of the database 21 with geographically referenced altitude information, which corresponds to the current position P1 of the aircraft 1 or is derived therefrom. Since the altitude data are preferably available digitally, the position point assigned to the position P1 can be obtained by an approximation method.

The safety altitude $\Delta h_{WCTP}$ at the position point P2 is determined from the respective altitude coordinate Z3 of the altitude data 22. To be more exact, the safety altitude $\Delta h_{WCTP}$ is generally formed from a comparison of the values of the altitude coordinate Z3 of the altitude data in a specific region U of the position P2 to the altitude value of the position point P2. In a preferred alternative, the safety altitude $\Delta h_{WCTP}$ is determined through the difference of the value of the altitude coordinate Z3 of the position point P2 and the altitude coordinate value Z3 of the highest point in the region of the position P2, if there is a point in the region that has a greater altitude value than the position point P2. If there is no point in the region U that has a greater altitude value than the position point P2, the safety altitude $\Delta h_{WCTP}$ is set at zero. Determining the difference can be determined by equating the difference value or the zero value with the safety altitude $\Delta h_{WCTP}$ or additionally by integrating an arithmetical function along with, e.g., a factor (e.g., with an additional safety factor) or an addition (an offset). The safety altitude $\Delta h_{WCTP}$ can also be determined by other mathematical methods, e.g., by statistical methods or by probability theory.

To determine the region U, preferably a geometric figure is presumed around the position point P2 and assigned to the position point P2 in an algorithmic manner. Its size, and in specific cases also its shape, can be derived from flight condition values or parameters of the system condition. Alternatively or additionally, the size or the shape of the geometric figure can be established in a predetermined manner. In this case, in particular, the size or the shape of the geometric figure is equated with the system error TSE ("total system error"). The system error is preferably formed from the horizontal error of the altitude data 22 of the database 21 and/or from the three-dimensional error of the navigation signal and/or deviation from the desired flight path (PSE "path steering error").

Preferably a circle, an ellipse, a square, or a rectangle is used as the shape of the geometric figure. For the fictive positioning of the geometric figure the surface center of gravity or if necessary another corresponding geometric reference variable is equated with the position point P2. Within the established region U, to determine the safety altitude $\Delta h_{WCTP}$, the highest point of the altitude data which can be a terrain point P3 and/or a man-made or obstacle point (point P4) is used.

Figure 4:
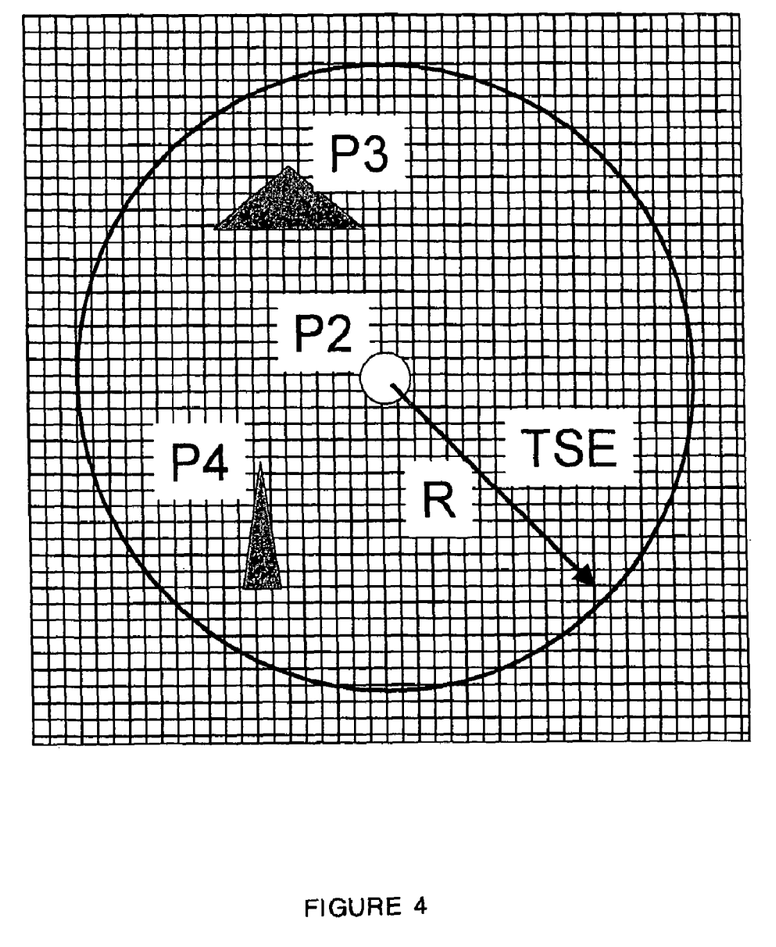
FIG. 4 shows a diagrammatic representation of the points of a terrain database in the region of a point P2 decisive for prediction, that is formed to determine the safety altitude.

According to the example shown in FIG. 4, the geometric figure is a circle. To determine the safety altitude $\Delta h_{WCTP}$, its center is placed in the position point P2 by a corresponding algorithm and the altitude coordinate values of the altitude data points within this circle are compared to the altitude coordinate value of the position point P2. In the example shown in FIG. 4, the altitude P4 is greater than the altitude P3. The safety altitude $\Delta h_{WCTP}$ then results in particular from the altitude coordinate value of the highest point in the determined region, minus the altitude coordinate value of the predicted position P2, if this difference is positive, or otherwise the value zero, if necessary respectively taking another function into consideration.

The distance altitude h* determined for the position P2 is supplied to the warning generator 11 that evaluates the distance altitude h* and on the basis of this evaluation if necessary transmits warning signals to the man-machine interface.

In the warning generator 11, to evaluate the approach situation of the aircraft to the terrain or in general to an obstacle by the distance altitude h* at least one distance altitude or warning limit $h_{warn}$ is implemented. This warning limit can be h* itself or by a function using h* and in particular using the derivative of h* according to the time, thus dh*/dt. A predicted approach of the aircraft to the same by a predetermined amount or a predicted exceeding of the same by a predetermined amount or a predicted achievement is equated with an excessively close approach of the aircraft to the terrain at the predicted position P2, so that in this situation the pilot is to be warned accordingly.

At least one distance altitude limit is provided that can be predetermined or dependent on the flight condition and in particular on the aircraft speed or the approach speed of the aircraft to an obstacle, on the activation of an operation method of the aircraft system or other system conditions.

In one embodiment of the warning generator 11, three warning altitude limits are implemented, so that the warning signal W1 and/or W2 contains different warning signals, depending on whether reaching the respective warning altitude limit is affirmed by the distance altitude h*.

In a further embodiment two warning altitude limits are used and the warnings are generated visually and acoustically in a mixed manner. A first acoustic warning occurs when the corresponding first warning altitude limit is exceeded that has the greatest altitude of all warning altitude limits. After this first warning altitude limit has been exceeded, in addition to the acoustic warning, a visual display 41 warning can be used, the visual display being e.g. a heads-up display (HUD) where the warning appears on the HUD. The display can be provided in the form of an arrow that gives the crew corresponding pull up instructions. Only after the second warning altitude limit has been exceeded that is evaluated as direct danger of collision of the aircraft with the ground, is a last acoustic warning to pull up the aircraft transmitted to the pilot. The determination of this last warning occurs preferably on the assumption of extremely short reaction times and maximum permissible load factors of the crew and maximum values for the rolling rate, pitching rate and yawing rate of the aircraft. Finally, a safety distance or a safety factor can also be used.

In an alternative embodiment of the low-altitude flight guidance system, the sound-generation module 42 generates a sound signal pulsed in a first frequency on reaching a first warning altitude limit, a constant sound signal on reaching a second warning altitude limit, and a sound signal pulsed in a second frequency on reaching a third warning altitude limit, whereby the second frequency is immediately recognizable as greater, e.g., twice as great, as the first frequency. The second warning altitude limit is thereby assigned a distance altitude h* that is smaller than the distance altitude h* assigned to the first warning altitude limit. This also applies in this exemplary embodiment analogously to the third and second limit. Optionally when the third warning altitude limit is reached, the frequency can be variable and proportional to an increase in the falling short of the third warning altitude limit.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A low-altitude flight guidance system for an aircraft comprising:
   a warning generator that generates a warning based upon a predicted position;
   a first sensor system having a terrain database and a calculation module that determines a current position of the aircraft with respect to terrain stored in the terrain database and that determines a reference altitude $h_{DB}$ of the terrain at the current position;
   a second sensor system and a module that determines a predetermined flight altitude difference $\Delta h_F$ at the predicted position and terrain data in a region U of the predicted position; and
   an altitude prediction module that predicts an altitude and forwards the predicted altitude to the warning generator,
   wherein the warning is based upon the aircraft reaching, approaching, or exceeding a warning altitude limit, and the altitude prediction module determination for the predicted position is based upon a prediction set point, and
   wherein the altitude prediction module determines a distance altitude h* from an altitude of an aircraft above ground $h_G$ supplied by the first sensor system, a flight altitude difference $\Delta h_F$ predetermined for the predicted position, a safety altitude $\Delta h_{WCTP}$, and a difference altitude $\Delta h_{P2}$ calculated from the terrain data with respect to the current position and the predicted position, and wherein the safety altitude $\Delta h_{WCTP}$ is determined from a difference of an altitude of the highest point and the altitude of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*.

2. The low-altitude flight guidance system according to claim 1, further comprising:
   a sensor that measures the flight altitude with respect to ground, the sensor being a radar altimeter.

3. The low-altitude flight guidance system according to claim 1, wherein the flight altitude $h_F$ predicted for the predicted position is determined from the current altitude above ground $h_G$ minus a rate of ascent multiplied by a prediction time.

4. A warning system for low-altitude flight guidance comprising:
   a warning generator that generates a warning with respect to a predicted position;
   an altitude prediction module that predicts an altitude and forwards the predicted altitude to the warning generator,
   wherein the warning is based on reaching, exceeding or approaching a warning altitude limit, the prediction module determines the predicted position on a basis of a prediction set point, the altitude prediction module further determines a distance altitude h* from an altitude of an aircraft above ground $h_G$ supplied by a sensor system, a flight altitude difference $\Delta h_F$ predetermined for the predicted position, a safety altitude $\Delta h_{WCTP}$, and a difference altitude $\Delta h_{P2}$ calculated from terrain data with respect to a current position and the predicted position.

5. The warning system according to claim 4 wherein the warning is output to one of a man-machine interface or an autopilot.

6. The warning generator according to claim 4 wherein the safety altitude $\Delta h_{WCTP}$ is determined from a difference of an altitude of the highest point and an altitude of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*.

7. A warning generator for low-altitude flight guidance that generates a warning with respect to a predicted position comprising:
   a first sensor system with a terrain database and a calculation module that determines a current position of an aircraft with respect to terrain stored in the terrain database and that determines a reference altitude $h_{DB}$ of the terrain at the current position;
   a second sensor system and an altitude prediction module that determine a predetermined flight altitude difference $\Delta h_F$ at the predicted position and that determine terrain data in a region of the predicted position; and
   a module that predicts a distance altitude h*,
   wherein the determination of the predicted position takes place in the altitude prediction module on a basis of a prediction set point, and the altitude prediction module determines the distance altitude h* from an altitude of the aircraft above ground $h_G$ supplied by the first sensor system, a flight altitude difference $\Delta h_F$ predetermined for the predicted position, a safety altitude $\Delta h_{WCTP}$ and a difference altitude $\Delta h_{P2}$ determined from terrain data with respect to the current position and the predicted position.

8. The warning generator according to claim 7 wherein the safety altitude $\Delta h_{WCTP}$ is determined from a difference of an altitude of a highest point and the altitude of the predicted position in a region of the predicted position, and the difference altitude $\Delta h_{P2}$ and the safety altitude $\Delta h_{WCTP}$, are subtracted from the predicted flight altitude $h_F$ in order to obtain the distance height h*.

9. The warning generator according to claim 7 wherein the warning generator outputs the warning to one of a man-machine interface or an autopilot.

10. A method for low-altitude flight guidance for an aircraft comprising:
    determining a current position of the aircraft with respect to terrain stored in a terrain database and determining a reference altitude $h_{DB}$ of the terrain at the current position;
    determining a predicted position on a basis of a prediction set point;
    calculating a distance altitude h* from an altitude of the aircraft above ground $h_G$ supplied by a sensor system;
    evaluating the distance altitude h* with respect to at least one distance altitude limit and, when necessary, transmitting warning signals on a basis of this evaluation; and
    calculating a flight altitude difference $\Delta h_F$ predetermined for the predicted position, a safety altitude $\Delta h_{WCTP}$, and a difference altitude $\Delta h_{P2}$ calculated from terrain data with respect to the current position and the predicted position,
    wherein the safety altitude $\Delta h_{WCTP}$ is determined from the altitude of the highest point of the predicted position in a region of the predicted position, and the difference altitude $\Delta h_{P2}$ and the safety altitude $\Delta h_{WCTP}$ are subtracted from the predicted flight altitude $h_F$ in order to obtain the distance altitude h*.

* * * * *